United States Patent
Kawai et al.

(10) Patent No.: US 11,053,749 B2
(45) Date of Patent: Jul. 6, 2021

(54) THREADED JOINT FOR OIL WELL STEEL PIPE

(71) Applicant: JFE Steel Corporation, Tokyo (JP)

(72) Inventors: Takamasa Kawai, Tokyo (JP); Taro Kanayama, Tokyo (JP); Masaki Yoshikawa, Tokyo (JP); Jun Takano, Tokyo (JP); Takuya Nagahama, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 267 days.

(21) Appl. No.: 16/328,006

(22) PCT Filed: Sep. 13, 2017

(86) PCT No.: PCT/JP2017/033006
§ 371 (c)(1),
(2) Date: Feb. 25, 2019

(87) PCT Pub. No.: WO2018/061767
PCT Pub. Date: Apr. 5, 2018

(65) Prior Publication Data
US 2019/0211632 A1    Jul. 11, 2019

(30) Foreign Application Priority Data

Sep. 30, 2016 (JP) .............................. JP2016-193707

(51) Int. Cl.
*F16L 15/00* (2006.01)
*E21B 17/08* (2006.01)
(Continued)

(52) U.S. Cl.
CPC .......... *E21B 17/08* (2013.01); *E21B 17/0423* (2013.01); *F16L 15/002* (2013.01); *F16L 15/007* (2013.01); *F16L 15/04* (2013.01)

(58) Field of Classification Search
CPC ....... F16L 15/002; F16L 15/004; F16L 15/04; F16L 15/007; E21B 17/08
(Continued)

(56) References Cited

U.S. PATENT DOCUMENTS 2,992,019 A    7/1961  MacArthur
5,423,579 A    6/1995  Blose et al.
(Continued)

FOREIGN PATENT DOCUMENTS

CA    3031919 A1    4/2018
CN    1155639 A     7/1997
(Continued)

OTHER PUBLICATIONS

Chinese Office Action with Search Report for Chinese Application No. 201710890006.4, dated Feb. 20, 2019, 9 pages.
(Continued)

*Primary Examiner* — Aaron M Dunwoody
(74) *Attorney, Agent, or Firm* — RatnerPrestia

(57) ABSTRACT

A threaded joint for oil well steel pipe is provided. The threaded joint includes a pin provided with a male thread, and a box provided with a female thread threadedly engaged with the male thread, and at an outer periphery side sealing portion, a cross-sectional area S1 of the pin at a seal point, and a cross-sectional area S0 of a pipe body portion, which is an unprocessed pin portion, satisfy an expression $(S1/S0) \times 100 \geq 15(\%)$, at an inner periphery side sealing portion, a cross-sectional area S2 of the box at a seal point, and a cross-sectional area S0' of a pipe body portion, which is an unprocessed box portion satisfy an expression $(S2/S0') \times 100 \geq 20(\%)$, and a surface area S3 of a contact portion of an intermediate shoulder between thread rows and the cross-sectional area S0 satisfy the expression $(S3/S0) \times 100 \geq 10(\%)$.

2 Claims, 3 Drawing Sheets

(51) Int. Cl.
*F16L 15/04* (2006.01)
*E21B 17/042* (2006.01)

(58) Field of Classification Search
USPC .................................... 285/333, 334, 390
See application file for complete search history.

(56) References Cited

U.S. PATENT DOCUMENTS

| | | | |
|---|---|---|---|
| 5,687,999 | A | 11/1997 | Lancry et al. |
| 9,657,873 | B2 | 5/2017 | Kawai et al. |
| 10,145,495 | B2 | 12/2018 | Elder et al. |
| 2004/0021314 | A1* | 2/2004 | Pina ............... F16L 15/004 285/94 |
| 2008/0191479 | A1 | 8/2008 | Suzuki |
| 2008/0265569 | A1 | 10/2008 | Carcagno et al. |
| 2012/0043756 | A1 | 2/2012 | Elder et al. |
| 2014/0116560 | A1 | 5/2014 | Kawai et al. |
| 2017/0101830 | A1 | 4/2017 | Inose et al. |

FOREIGN PATENT DOCUMENTS

| | | |
|---|---|---|
| CN | 102678070 A | 9/2012 |
| CN | 103140645 A | 6/2013 |
| CN | 104775761 A | 7/2015 |
| CN | 207394154 U | 5/2018 |
| EP | 0648967 A1 | 4/1995 |
| EP | 0767335 A1 | 4/1997 |
| EP | 3064818 A1 | 9/2016 |
| JP | 09126366 A | 5/1997 |
| JP | 1089554 A | 4/1998 |
| JP | 2005351324 A | 12/2005 |
| JP | 2012510009 A | 4/2012 |
| JP | 5232475 B2 | 7/2013 |
| JP | 2013536339 A | 9/2013 |
| RU | 2134371 C1 | 8/1999 |
| WO | 2012118167 A1 | 9/2012 |
| WO | 2015194160 A1 | 12/2015 |

OTHER PUBLICATIONS

Australian Examination Report for Australian Application No. 2017338057, dated May 10, 2019, 3 pages.
Extended European Search Report for European Application No. 17 855 723.7, dated Jun. 26, 2019, 8 pages.
Russian Office Action for Russian Application No. 2019105594, dated Aug. 19, 2019 with translation, 13 pages.
International Search Report and Written Opinion for International Application No. PCT/JP2017/033006, dated Nov. 14, 2017—6 pages.
Canadian Office Action for Canadian Application No. 3,031,919, dated Dec. 18, 2019, 4 pages.
Australian Examination Report for Australian Application No. 2017338057, dated Dec. 20, 2019, 3 pages.
Chinese Office Action with Search Report for Chinese Application No. 201710890006.4, dated Jan. 7, 2020, 8 pages.
Chinese Office Action for Chinese Application No. 201710890006.4, dated Apr. 18, 2020, with Concise Statement of Relevance of Office Action, 4 pages.

* cited by examiner

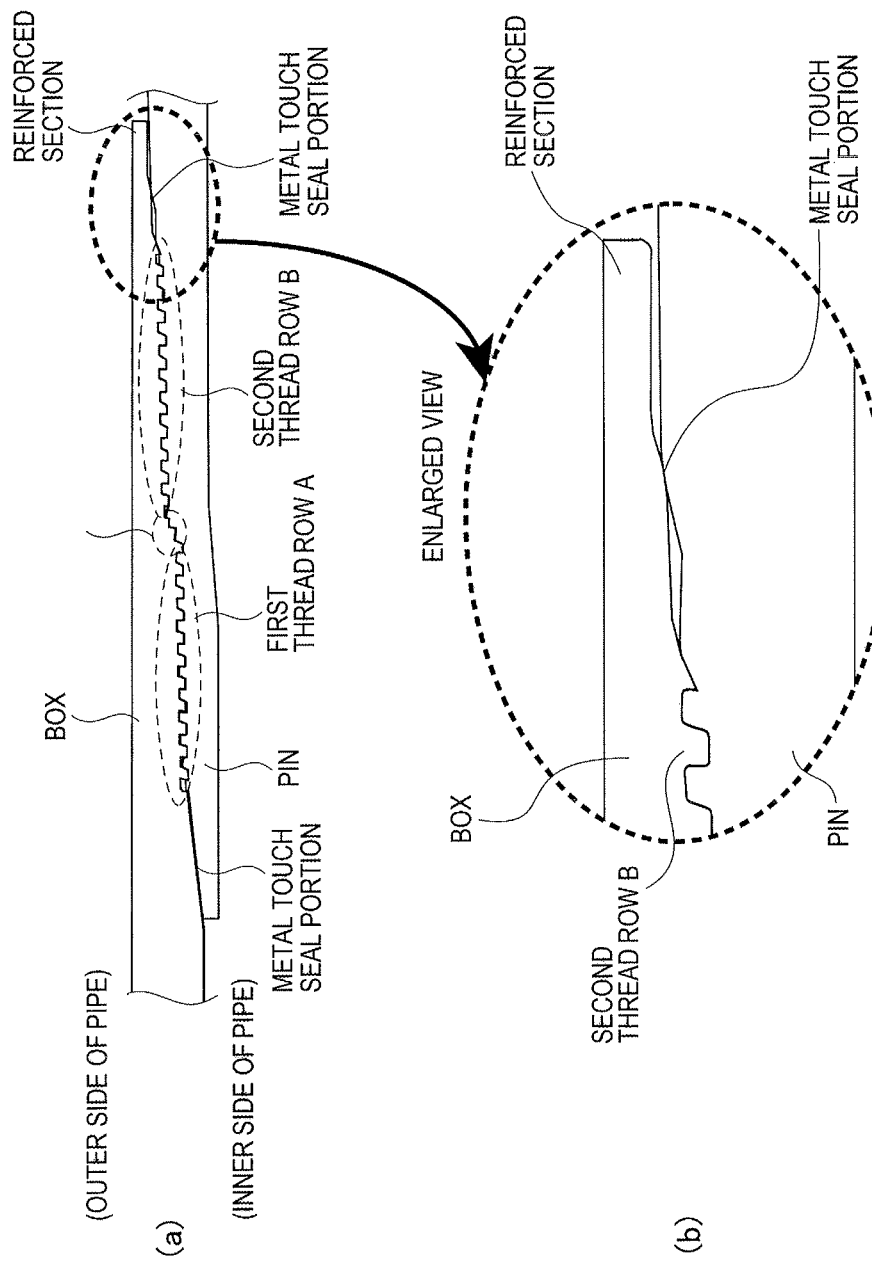

THREADED JOINT FOR OIL WELL STEEL PIPE

CROSS REFERENCE TO RELATED APPLICATIONS

This is the U.S. National Phase application of PCT/JP2017/033006, filed Sep. 13, 2017, which claims priority to Japanese Patent Application No. 2016-193707, filed Sep. 30, 2016, the disclosures of these applications being incorporated herein by reference in their entireties for all purposes.

FIELD OF THE INVENTION

The present invention relates to a threaded pipe joint used for connecting oil well pipes including tubing and casing used generally in exploration of oil wells or gas wells and in production. That is, the present invention relates to a threaded pipe joint used for connecting steel pipes such as oil country tubular goods (OCTG), riser pipes, and line pipes. The threaded pipe joint of the present invention is superior in sealing properties and compression resistance.

BACKGROUND OF THE INVENTION

Threaded pipe joints are widely used in connecting steel pipes used in oil-producing industrial installations such as oil well pipes. For the connection of pipes used in oil or gas prospecting and production, standard threaded pipe joints based on the API (American Petroleum Institute) standard are typically used.

Since crude oil wells and natural gas wells have recently increased in depth, and horizontal wells and directional wells are now more common than vertical wells, excavation and production environments are increasingly under harsh condition. Furthermore, an increase in well development under hostile environments, such as in ocean and polar regions, has led to diversified performance requirements for threaded pipe joints, such as compression resistance, bending resistance, and sealability against external pressure. For such required performances, high performance and particular threaded pipe joints which are referred to as premium joints are increasingly used in recent years.

In order to reduce the amount of excavation at the time of well development, reduction in width of the wells is required. Among the aforesaid premium joints, requirements for an integral-type threaded pipe joint that directly connects pipes with no coupling member interposed therebetween are increasing.

The premium joint normally has a tapered thread, a metal-to-metal seal portion, and a torque shoulder portion at the end of each pipe. These are components forming each of a pin that is a male-shaped portion provided at one end of a pipe and a box that is a female-shaped portion provided at the other end of the pipe and is screwed or fitted on the male-shaped portion. These components are designed such that when a joint (which means a threaded pipe joint, the same applies hereinafter) is tightened, female and male components having the same name face each other.

The tapered thread is important for firmly securing the joint. The metal-to-metal seal portion ensures seal properties by bringing the box and the pin into metal-to-metal contact with each other in the region of the metal-to-metal seal portion. The torque shoulder portion serves as a shoulder face that acts as an abutment during the make-up of the joint.

In the integral-type threaded pipe joint (hereinafter also referred to as integral joint), one or two or more metal-to-metal seal portions are provided in the axial direction (which means the axial direction of the pipe, the same applies hereinafter). At least one of the metal-to-metal seal portions is provided on the outer peripheral surface of an unthreaded portion (hereinafter referred to as nose) continuous with the pin-front-end-side thread end of the tapered thread of the pin, and on the inner peripheral surface of an unthreaded portion (hereinafter referred to as nose hole) continuous with the box-back-end-side thread end of the tapered thread of the box. When make-up the joint, the metal-to-metal seal portion of the nose and the metal-to-metal seal portion of the nose hole come into contact with each other in the radial direction, and this metal-to-metal seal portion forms a seal surface (referred to as inner radial seal surface for convenience sake) that prevents fluid inside the pipe from entering the region of the tapered thread.

In some integral joints, in each of the pin and the box, the region of the tapered thread is divided into two parts in the axial direction. Of the two parts, the thread row on the pin-front-end side and the thread row on the box-back-end side engaged with this are referred to as first thread row. On the other hand, the thread row on the pin-back-end side and the thread row on the box-front-end side engaged with this are referred to as second thread row. In the radial direction (which means the radial direction of the pipe, the same applies hereinafter), the first thread row is on the inner side, and the second thread row is on the outer side. The torque shoulder portion is provided at the boundary of the first thread row and the second thread row, and this is referred to as intermediate shoulder.

In an integral joint having the intermediate shoulder, when two metal-to-metal seal portions are provided in the axial direction, one of the two metal-to-metal seal portions forms the inner radial seal surface. The other metal-to-metal seal portion is provided on the outer peripheral surface of the unthreaded portion continuous with the back end of the second thread row of the pin (referred to as pin-back-end-side unthreaded surface for convenience sake), and on the inner peripheral surface of the unthreaded portion continuous with the front end of the second thread row of the box (referred to as box-front-end-side unthreaded surface for convenience sake). When make-up the joint, the metal-to-metal seal portion of the pin-back-end-side unthreaded surface and the metal-to-metal seal portion of the box-front-end-side unthreaded surface come into contact with each other in the radial direction, and this metal-to-metal seal portion forms a seal surface (referred to as outer radial seal surface for convenience sake) that prevents fluid outside the pipe from entering the region of the tapered thread.

A threaded joint for pipes (threaded pipe joint) described in Patent Literature 1 is shown in FIG. 3 as an example of conventional art of an integral joint having the intermediate shoulder. The aim (object) of the invention described in Patent Literature 1 is to produce a threaded joint for pipes that maintains appropriate rigidity and that is provided with an improved seal, to improve the structural resistance (characteristic) of the joint to a high load, specifically to a compressive load, and to prevent the characteristic from affecting the seal function. In the invention described in Patent Literature 1, a reinforcing section protruding from the metal-to-metal seal portion of the box-front-end-side unthreaded surface to the frontmost end of the box is provided, the length, or the length and the wall thickness of this reinforcing section are regulated, and the total length of the reinforcing section of the box is prevented from coming into contact with the opposing pin-back-end side pipe (pipe body portion).

PATENT LITERATURE

PTL 1: Japanese Patent No. 5232475

SUMMARY OF THE INVENTION

However, with the aforesaid technology described in PTL 1, it cannot be said that the sealing property is ensured sufficiently when a high load, which is a combined load including tension, compression, as well as internal pressure and external pressure, is applied thereon, so that improved sealing properties have been required. In addition, an improvement of compression resistance is also required in addition to the improvement of the sealing properties.

Accordingly, it is an object according to aspects of the present invention to provide a threaded joint for an oil well steel pipe superior in sealing properties and compression resistance.

As used in accordance with aspects of the present invention, the expression "superior in sealing property" is intended to include passing a sealing property assessment test under the conditions of a combined load for a threaded joint specified in Series A test of ISO13679:2002.

As used in accordance with aspects of the present invention the expression "superior in compression resistance" is intended to include passing a sealing property assessment test even when a high compressive load is applied under compression conditions, which is an option of the load conditions in the aforesaid ISO test. The tensile load is specified that the maximum value is 95% of a tensile strength of/the pipe or the joint and the compression resistance is expressed as a percentage with respect to the tensile load. In a joint of a T&C (Threaded and Coupled) type, the strength of a connecting portion is normally determined by the tensile strength of the pipe, in which performance not lower than a compression rate of 80% of the tensile strength of the pipe is expressed to have high compressibility, and if a compression rate of 100% is achieved, it can be said to have very high compression resistance. In the joint of a semi-flush type, the tensile strength is determined by a design of the joint, and if 70% or more of the tensile strength of the pipe is achieved, it can be said to have a design having a sufficient tensile strength. In the joint of the semi-flush type, a performance which achieves 70% or more of compression rate compared with the tensile strength of the joint is expressed to have high compressibility, and if a compression rate of 100%, which is equivalent to the tensile strength of the joint is achieved, it can be said to have very high compression resistance.

The present inventors have intensively studied for solving the aforesaid problem, and obtained the following findings. In the related art, an attention is paid on the fact that the rigidity of the seal portion on the pipe end side is not sufficiently considered as the reason why desired sealing properties cannot be secured. The inventors have found that the rigidity is secured by specifying a cross-sectional area at a predetermined seal point, whereby a sufficient surface pressure may be obtained and sufficient sealing properties may be secured even when a high load is applied. When a tensile force is applied, a seal portion formed by contact between an inner peripheral surface of the box formed on the pipe end side of the box and an outer peripheral surface of the pin is subject to deformation of reducing the diameter of the pin simultaneously with tensile deformation. Therefore, the amount of interference of the seal is reduced, and thus a seal surface pressure of the seal portion on the pipe end side of the box is reduced correspondingly. In other words, the inventors have found that the contact surface pressure at the seal portion on the pipe end side of the box is more likely to be reduced, and thus a prescribed value of a seal cross-sectional area of the box at the seal portion on the pipe end side is preferably set to be larger than the cross-sectional area of the pin on the side of the seal portion on the pipe end side for securing sealing properties. In addition, the inventors have found that compression resistance may be secured by specifying a cross-sectional area ratio of the intermediate shoulder.

The gist of aspects of the present invention achieved based on the above-described findings is as follows.

[1] A threaded joint for oil well steel pipe comprising:
a pin having a male thread that is a male tapered thread at one end of a steel pipe; and
a box having a female thread that is a female tapered thread threadedly engaged with the male thread at the other end of a steel pipe,
the pin and the box forming radial seal structures which seals a fluid by metal contact with each other at two positions, one on an outer periphery side sealing portion of the pin on a pipe end side and one on an inner periphery side sealing portion of the box on a pipe end side, the threaded joint further comprising:
an intermediate shoulder formed between thread rows of the female and male tapered threads, wherein
on the outer periphery side sealing portion formed on the pin on the pipe end side,
a cross-sectional area S1 (mm$^2$) of the pin at a seal point which is a portion on the outer peripheral surface of a nose portion on the pin side which comes into contact with the seal surface on the box side first, and a cross-sectional area S0 (mm$^2$) of a pipe body portion, which is an unprocessed pin portion satisfy the following expression (1),
on the inner periphery side sealing portion formed on the box on the pipe end side,
a cross-sectional area S2 (mm$^2$) of the box at a seal point, which is a portion on the inner peripheral surface of the pipe end portion on the box side which comes into contact with the seal surface on the pin side first and a cross-sectional area S0' (mm$^2$) of a pipe body portion, which is an unprocessed box portion satisfy the following expression (2), and
a surface area S3 (mm$^2$) of a contact portion of the intermediate shoulder and the cross-sectional area S0 (mm$^2$) of the pipe body portion, which is the unprocessed pin portion, satisfy the following expression (3), $$(S1/S0) \times 100 \geq 15 (\%) \tag{1}$$

$$(S2/S0') \times 100 \geq 20 (\%) \tag{2}$$

$$(S3/S0) \times 100 \geq 10 (\%) \tag{3}$$

[2] The threaded joint for oil well steel pipe according to [1] wherein the S1, the S0, the S2, and the S0' satisfy the following expression (4), $$(S1/S0) \leq (S2/S0') \tag{4}$$

According to aspects of the present invention, a threaded pipe joint for an oil well steel pipe superior in sealing properties and compression resistance may be provided.

BRIEF DESCRIPTION OF THE DRAWINGS

FIG. 3 is a cross-sectional view illustrating an example of a threaded joint for oil well steel pipe of the related art in which (a) is a cross-sectional view in a pipe axis direction, and (b) is an enlarged cross-sectional view illustrating a metal touch seal portion.

DETAILED DESCRIPTION OF EMBODIMENTS OF THE INVENTION

Figure 1:
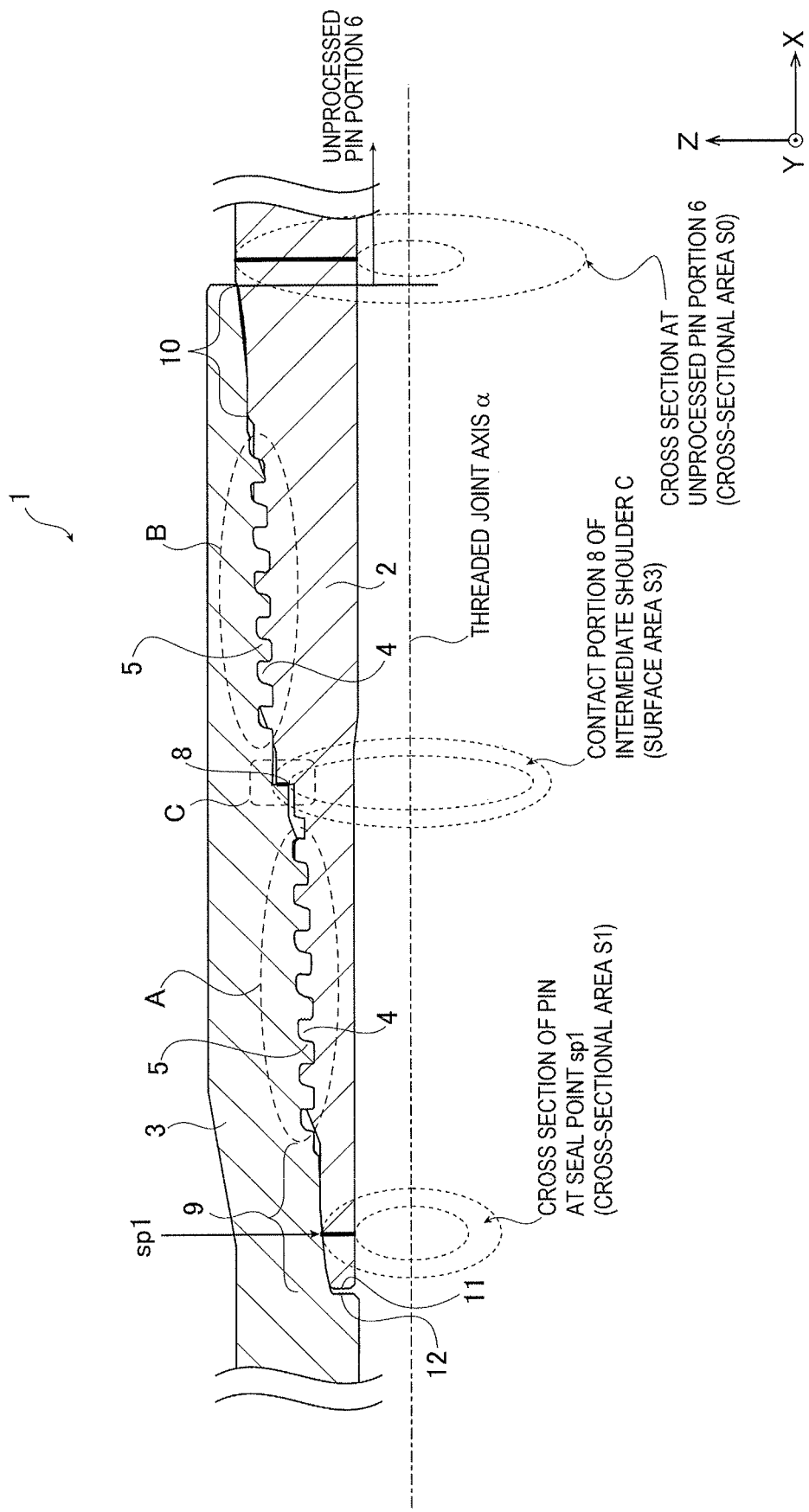
FIG. 1 is a cross-sectional view illustrating a threaded joint for oil well steel pipe for explaining an example of an embodiment of the present invention, and is also a drawing for explaining an expression (1) and an expression (3).
Figure 2:
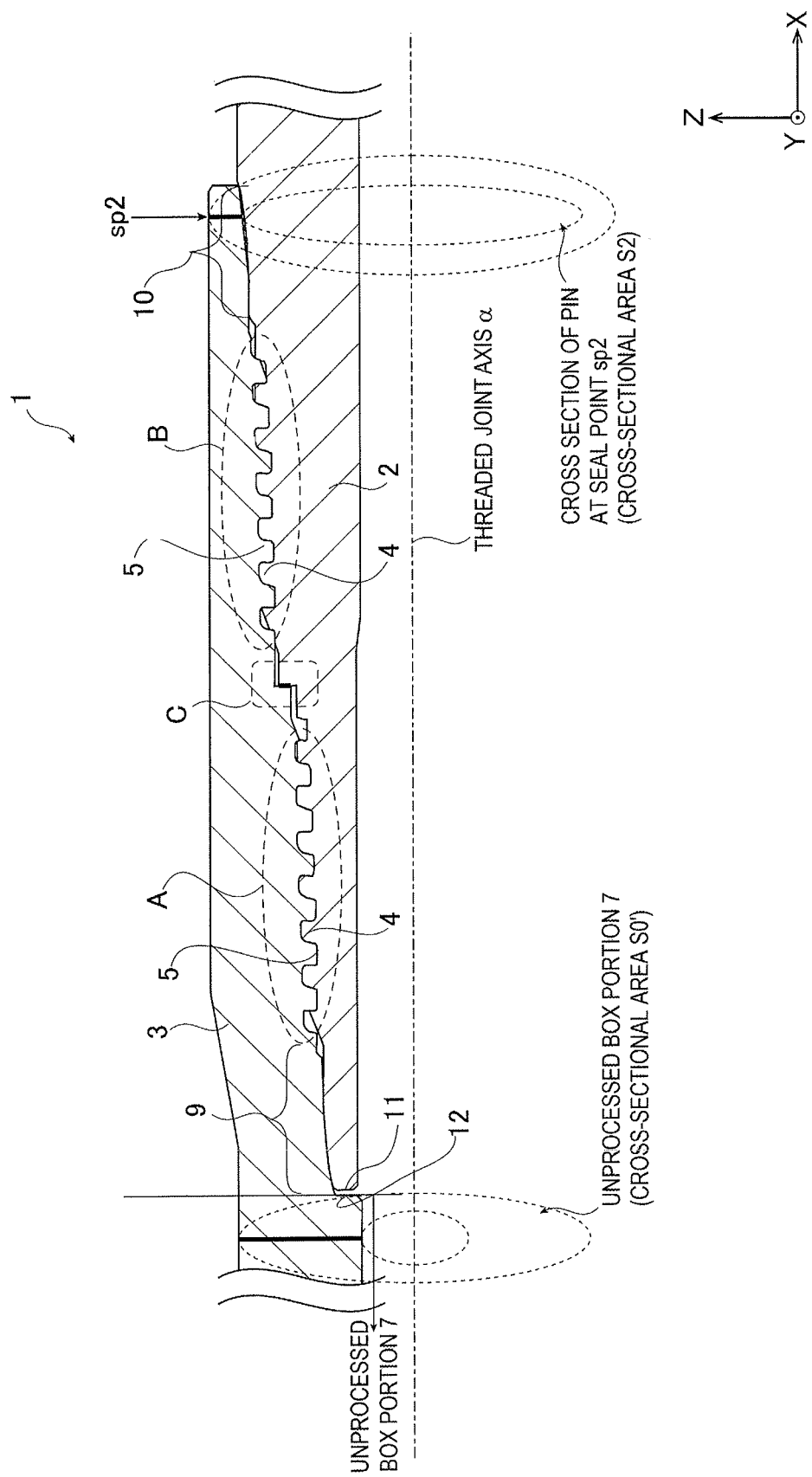
FIG. 2 is a cross-sectional view illustrating the threaded joint for oil well steel pipe for explaining an example of the embodiment of the present invention, and is a drawing also for explaining an expression (2).

Referring now to the drawings, embodiments of the present invention will be described below. FIG. 1 is a cross-sectional view illustrating a threaded joint for oil well steel pipe for explaining an example of an embodiment of the present invention, and is also a drawing for explaining an expression (1) and an expression (3) which will be described below. FIG. 2 is also a cross-sectional view illustrating the threaded joint for oil well steel pipe for explaining an example of the embodiment of the present invention, and is also a drawing for explaining an expression (2) which will be described below. Note that FIG. 3 is a cross-sectional view illustrating an example of a threaded joint for oil well steel pipe of the related art, in which (a) is a cross-sectional view in a pipe axis direction, and (b) is an enlarged cross-sectional view illustrating a metal touch seal portion.

A threaded joint 1 for oil well steel pipe according to aspects of the present invention connects steel pipes with a pin 2 and a box 3. As illustrated in FIG. 1 and FIG. 2, the threaded joint 1 for oil well steel pipe according to aspects of the present invention is a threaded joint (premium joint) including the pin 2 and the box 3 connected by thread connection. The threaded joint 1 for oil well steel pipe according to aspects of the present invention is an integral type threaded joint connecting the steel pipes directly with each other with the pin 2 and the box 3.

The pin 2 is provided with a male thread 4, which is a male tapered thread provided at one end of the steel pipe. The box 3 is provided with a female thread 5, which is a female tapered thread that engages a male thread 4 provided at the other end of the steel pipe.

The threaded joint 1 for oil well steel pipe according to aspects of the present invention includes a radial seal structure in which the pin 2 and the box 3 come into metal contact with each other to seal a fluid at two positions; at an outer periphery side sealing portion 9 of the male thread 4 on a pipe end side (a negative side of an X-axis which is parallel to the threaded joint axis α in FIGS. 1 and 2) and at an inner periphery side sealing portion 10 of the female thread 5 on a pipe end side (a positive side of the X-axis direction in FIGS. 1 and 2). The outer periphery side sealing portion 9 and the inner periphery side sealing portion 10 each may be a metal touch seal portion described in conjunction with FIG. 3.

The outer periphery side sealing portion 9 is capable of forming a seal surface which prevents a fluid inside the pipe from entering an area of the tapered thread by contact between the metal touch seal portions of a nose (a unthreaded portion of the pin 2, which continues with a thread end of the tapered thread on a pin-front-end side) and a nose hole (a unthreaded portion of the box 3, which continues with a thread end of the tapered thread on a box-back-end side) when make-up the joint.

The inner periphery side sealing portion 10 is provided on an outer peripheral surface of the aforesaid pin 2 at a unthreaded portion which continues with a back-end side of a second thread row B (referred to as a unthreaded surface on a pin-back-end side for convenience sake) and on an inner peripheral surface of a unthreaded portion which continues with a distal end of the second thread row B of the aforesaid box 3 (referred to as a unthreaded surface on the box-front-end side for convenience sake). The inner periphery side sealing portion 10 forms a seal surface that prevents a fluid outside the pipe from entering the area of the tapered threads by contact between the seal portions of the aforesaid unthreaded surface on the pin-back-end side of the pin and the aforesaid unthreaded surface on the box-front-end side of the box when make-up the joint.

The threaded joint 1 for oil well steel pipe according to aspects of the present invention includes an intermediate shoulder C formed between the two thread rows (the first thread row A and the second thread row B) of the male and female tapered threads. The intermediate shoulder C serves as a torque shoulder portion that has a role of an abutment while the make-up the joint.

Additionally, the threaded joint 1 for oil well steel pipe according to aspects of the present invention may have a shoulder portion 11 at a front-end of the pin 2, and a shoulder 12 which comes into contact with the shoulder portion 11 may be provided on the box 3.

The threaded joint 1 for oil well steel pipe according to aspects of the present invention is characterized in that a cross-sectional area S1 (mm$^2$) of the pin at a seal point sp1 (see FIG. 1) which is a portion on the outer peripheral surface of the nose portion on the pin 2 side which comes into contact with the seal surface on the box 3 side first, and a cross-sectional area S0 (mm$^2$) of a pipe body portion, which is an unprocessed pin portion 6 satisfy the following expression (1) at the outer periphery side sealing portion 9. The pipe body portion (the unprocessed pin portion 6) indicates an area of the pin 2 other than the male thread provided on a front-end thereof, and has a cylindrical shape.

$$(S1/S0) \times 100 \geq 15 (\%) \tag{1}$$

If (S1/S0)×100 is smaller than 15%, a leak is caused by a tension and an internal pressure, so that sufficient sealing properties may not be secured. Therefore, in accordance with aspects of the present invention, the value of (S1/S0)× 100 is set to 15% or more, preferably 20% or more, and more preferably 25% or more. In contrast, in accordance with aspects of the present invention, if (S1/S0)×100 exceeds 50%, the cross-sectional areas of the intermediate shoulder C and the outer periphery side sealing portion 9 cannot be secured, so that a sufficient performance may not be provided. Therefore, in accordance with aspects of the present invention, (S1/S0)×100 is preferably set to a value not more than 50%, and more preferably, not more than 40%.

As used herein the aforesaid term "the cross sections of the cross-sectional areas S1, S0" are intended to include cross sections along planes vertical to the threaded joint axis α (positive and negative directions along the X-axis), and a cross sections of cross-sectional areas S2, S3 which will be described below are intended to include cross sections along planes vertical to the threaded joint axis α (the positive and negative direction along the X-axis).

As used herein the aforesaid term "the pin 2 side which comes into contact with the seal surface on the box 3 side first" is intended to include the frontmost end position (the frontmost end position in the negative direction along the X-axis) of the pin 2 which comes into contact with the seal surface on the box 3 side.

The threaded joint 1 for oil well steel pipe according to aspects of the present invention is characterized in that the cross-sectional area S2 (mm$^2$) of the box 3 at a seal point sp2 (see FIG. 2) which is a portion on the inner peripheral surface of the pipe end portion on the box 3 side which comes into contact with the seal surface on the pin 2 side first, and a cross-sectional area S0' (mm$^2$) of a pipe body portion, which is an unprocessed box portion 7 satisfy the following expression (2) at the outer surface side seal portion 10. As used herein the term "the pipe body portion (the unprocessed box portion 7)" is intended to include an area of the box 3 other than a female thread provided at the front-end thereof, which has a cylindrical shape.

$$(S2/S0') \times 100 \geq 20 (\%) \qquad (2)$$

If (S2/S0')×100 is smaller than 20%, a leak is caused by a tension and an external pressure, so that sufficient sealing properties may not be secured. Therefore, in accordance with aspects of the present invention, the value of (S2/S0')×100 is set to 20% or more, preferably 25% or more, and more preferably 30% or more. In contrast, in accordance with aspects of the present invention, if (S2/S0')×100 exceeds 50%, the cross-sectional areas of the inner periphery side sealing portion 10 and the intermediate shoulder C are difficult to be secured, so that a sufficient performance may not be provided. Although realization of a large cross-sectional area by increasing an outer diameter of the inner periphery side sealing portion is not impossible, increasing the outer diameter is against realization of the slim joint, which is a characteristic of the integral type threaded joint, and thus designing with an excessive outer diameter is not realistic. Therefore, in accordance with aspects of the present invention, (S2/S0')×100 is preferably set to a value not more than 50%, and more preferably, not more than 45%.

As used herein the aforesaid term "the box 3 side which comes into contact with the seal surface on the pin 2 side first" is intended to include the frontmost end position (the frontmost end position in the positive direction along the X-axis) of the box 3 which comes into contact with the seal surface on the pin 2 side.

In addition, the threaded joint 1 for oil well steel pipe according to aspects of the present invention is also characterized in that the surface area S3 (mm$^2$) of a contact portion 8 (see FIG. 1) of the intermediate shoulder C and the cross-sectional area S0 (mm$^2$) of the pipe body portion, which is the unprocessed pin portion 6, satisfy the following expression (3), $$(S3/S0) \times 100 \geq 10 (\%) \qquad (3)$$

If (S3/S0)×100 is smaller than 10%, an excessive load is applied to the seal portion at the time of compression and causes deterioration of sealing properties in association with plastic deformation, and a leak is caused by a tension and an internal pressure, so that sufficient sealing properties may not be secured. In addition, a plastic deformation may occur at the shoulder portion when make-up the joint, so that such an event that the joint cannot be tightened any longer may result. Therefore, in accordance with aspects of the present invention, the value of (S3/S0)×100 is set to 10% or more, preferably 15% or more, and more preferably, 20% or more. In contrast, in accordance with aspects of the present invention, if (S3/S0)×100 exceeds 50%, the cross-sectional areas of the outer periphery side sealing portion 9 and the inner periphery side sealing portion 10 cannot be secured, so that a sufficient performance may not be provided. Therefore, in accordance with aspects of the present invention, (S3/S0)×100 is preferably set to a value not more than 50%, and more preferably, not more than 40%.

In accordance with aspects of the present invention, desired sealing properties and compression resistance are achieved only when all the aforesaid expressions (1) to (3) are satisfied.

In the threaded joint 1 for oil well steel pipe according to aspects of the present invention, the aforesaid S1, S0, S2, and S0' preferably satisfy the following expression (4).

$$(S1/S0) \leq (S2/S0') \qquad (4)$$

When a tensile force is applied to the joint, deformation in a direction of reducing the diameter occurs simultaneously with deformation in a direction of tension. Therefore, the amount of interference of the seal is reduced, and thus a seal surface pressure of the inner periphery side sealing portion formed on the pipe end side of the box is reduced correspondingly. In other words, as the contact surface pressure at the inner periphery side sealing portion 10 more likely to be reduced, a prescribed value of a seal cross-sectional area of the inner periphery side sealing portion 10 is preferably set to be larger than that of the outer periphery side sealing portion 9 for securing sealing properties. Therefore, in accordance with aspects of the present invention, further reliable sealing properties may be secured by setting (S2/S0') not to be lower than (S1/S0), that is, by setting the cross-sectional area ratio of the seal at the inner periphery side sealing portion 10 to be larger than the ratio of the cross-sectional area of the seal at the outer periphery side sealing portion 9. Therefore, in accordance with aspects of the present invention, preferably, the relationship "(S1/S0) (S2/S0')" is satisfied, and more preferably, the value of (S2/S0') is 1.1 times or more, further preferably, 1.2 times or more, the value of (S1/S0).

In accordance with aspects of the present invention, outer diameters of the unprocessed pin portion 6 and the unprocessed box portion 7 are preferably from 5 to 16 inches, and more preferably from 5.5 to 14 inches, although not specifically limited thereto.

In accordance with aspects of the present invention, thicknesses of the unprocessed pin portion 6 and the unprocessed box portion 7 are preferably at least 12 mm, and more preferably at least 15 mm.

In the threaded joint according to aspects of the present invention, a load flank angle is preferably from 5 to 30 degrees, and more preferably from 10 to 25 degrees.

A stabbing flank angle is preferably from −10 to 0 degrees, and more preferably from −7 to −3 degrees.

As described above, according to aspects of the present invention, a threaded joint for oil well steel pipe superior in sealing properties and compression resistance may be provided.

EXAMPLES

Aspects of the present invention will be described below based on examples.

Samples of the threaded joint including a pin formed by machining an end portion of a steel pipe of a steel type Q125 of API 5CT having an outer diameter 9⅝ inches×a thickness of 0.545 inches (outer diameter 244.48 mm×thickness 13.84 mm) and a box corresponding thereto were manufactured and a series A test of ISO 13679:2002 was conducted. When conducting this test, experiment conditions of respective levels shown in Table 1 was employed. As experiment conditions which are not shown in Table 1, a load flank angle of −5 degrees and a stabbing flank angle of 15 degrees were employed for a thread contact surface commonly to all the levels.

As used in Table 1 the expression "the area ratio (%) of the outer periphery side sealing portion with respect to an unprocessed portion of a mother pipe" means "a ratio (($S_1$/$S_0$)×100 [%]) of the cross-sectional area $S_1$ (mm$^2$) of a pin at a seal point, which is a portion on the outer peripheral surface of the nose portion on the pin side which comes into contact with the seal surface on the box side first with respect to the cross-sectional area $S_0$ (mm$^2$) of the pipe body portion, which is the unprocessed pin portion.

The expression "the area ratio (%) of the inner periphery side sealing portion with respect to the unprocessed portion of the mother pipe" means "a ratio (($S_2$/$S_0'$)×100 [%]) of the cross-sectional area $S_2$ (mm$^2$) of a box at a seal point, which is a portion on the inner peripheral surface of the pipe end portion on the box side which comes into contact with the seal surface on the pin side first with respect to the cross-sectional area $S_0'$ (mm$^2$) of the pipe body portion, which is the unprocessed box portion.

The expression "area ratio (%) of the intermediate shoulder with respect to the unprocessed portion of the mother pipe" means "a ratio (($S_3$/$S_0$)×100 [%]) of the surface area $S_3$ (mm$^2$) of a contact portion of the intermediate shoulder with respect to the cross-sectional area $S_0$ (mm$^2$) of the pipe body portion, which is the unprocessed pin portion.

The test of this example is a test for assessing the sealing properties by applying a combined load including a tensile force/compression force and internal pressure/external pressure in the series A test, and the load schedule is defined by VME 95% and API Collapse pressure. In this test, the maximum tension rate in the test is set to 70%.

A case of passing the seal test under the load conditions of the maximum compression rate of 49% (70% in ratio with respect to the tension rate) is considered to be superior both in sealing properties and compression resistance, and to pass the performance assessment. A case of passing the seal test under the load conditions of the maximum compression rate of 70% (100% in ratio with respect to the tension rate) is considered to be superior in compression resistance.

A result will be shown in Table 1.

As shown in Table 1, in Comparative Example 1, the area ratio of the intermediate shoulder was lower than 10%, which is very small. Therefore, plastic deformation occurred in the shoulder portion at the time of being tightened, and the test was failed when make-up the joint.

In Comparative Example 2, as the area ratio of the intermediate shoulder was lower than 10%, an excessive load was applied to the seal portion at the time of compression, and deterioration of sealing properties associated with plastic deformation resulted. Therefore, the test was failed because of an occurrence of a leak due to the tension and the internal pressure (hereinafter, referred to as tension+internal pressure).

In Comparative Example 3, as the area ratio of the outer periphery side sealing portion was lower than 15%, the test was failed because of an occurrence of a leak due to the tension+internal pressure.

In Comparative Example 4, as the area ratio of the inner periphery side sealing portion was lower than 20%, the test was failed because of an occurrence of a leak due to the tension and external pressure (tension+external pressure).

In contrast, the test was passed in all of Examples 1 to 5 of the present invention, and it became apparent that the examples of the present invention have superior sealing properties and compression resistance.

REFERENCE SIGNS LIST 1 threaded joint for oil well steel pipe
2 pin
3 box
4 male thread
5 female thread
6 unprocessed pin portion
7 unprocessed box portion
8 contact portion
9 outer periphery side sealing portion
10 inner periphery side sealing portion
11, 12 shoulder portion
A first thread row
B second thread row
C intermediate shoulder

TABLE 1

| | Area Ratio with respect to Unprocessed Portion of Mother Pipe | | | |
| --- | --- | --- | --- | --- |
| | Outer Periphery Side Sealing Portion | Inner Periphery Side Sealing Portion | Intermediate Shoulder | Test Result |
| Example 1 of Present Invention | 15% | 20% | 20% | Passed (Maximum Compression Rate 49%) |
| Example 2 of Present Invention | 20% | 25% | 10% | Passed (Maximum Compression Rate 49%) |
| Example 3 of Present Invention | 25% | 25% | 35% | Passed (Maximum Compression Rate 49%) |
| Example 4 of Present Invention | 30% | 40% | 20% | Passed (maximum compression rate 70%) |
| Example 5 of Present Invention | 25% | 30% | 35% | Passed (maximum compression rate 70%) |
| Comparative Example 1 | 20% | 25% | 5% | Plastic deformation occurred when tightened |
| Comparative Example 2 | 20% | 20% | 8% | Leaked with tension + internal pressure after compression |
| Comparative Example 3 | 10% | 25% | 20% | Leaked with tension + internal pressure |
| Comparative Example 4 | 30% | 15% | 20% | Leaked with tension + external pressure | sp1 seal point
sp2 seal point
α threaded joint axis

The invention claimed is:

1. A threaded joint for oil well steel pipe comprising:
a pin having a male thread that is a male tapered thread at one end of a steel pipe; and
a box having a female thread that is a female tapered thread threadedly engaged with the male thread at an other end of a steel pipe,
the pin and the box forming radial seal structures which seals a fluid by metal contact with each other at two positions, one on an outer periphery side sealing portion of the pin on a pipe end side and one on an inner periphery side sealing portion of the box on a pipe end side, the threaded joint further comprising:
an intermediate shoulder formed between thread rows of the female and male tapered threads, wherein
on the outer periphery side sealing portion formed on the pin on the pipe end side,
a cross-sectional area S1 (mm2) of the pin at a seal point which is a portion on the outer peripheral surface of a nose portion on the pin side which comes into contact with the seal surface on the box side first, and a cross-sectional area S0 (mm2) of a pipe body portion, which is an unprocessed pin portion satisfy the following expression (1),
on the inner periphery side sealing portion formed on the box on the pipe end side,
a cross-sectional area S2 (mm2) of the box at a seal point, which is a portion on the inner peripheral surface of the pipe end portion on the box side which comes into contact with the seal surface on the pin side first and a cross-sectional area S0' (mm2) of a pipe body portion, which is an unprocessed box portion satisfy the following expression (2), and
a surface area S3 (mm2) of a contact portion of the intermediate shoulder and the cross-sectional area S0 (mm2) of the pipe body portion, which is the unprocessed pin portion, satisfy the following expression (3), $$(S1/S0) \times 100 \geq 15 (\%) \tag{1}$$

$$(S2/S0') \times 100 \geq 20 (\%) \tag{2}$$

$$(S3/S0) \times 100 \geq 10 (\%) \tag{3}$$

2. The threaded joint for oil well steel pipe according to claim 1, wherein the S1, the S0, the S2, and the S0' satisfy the following expression (4), $$(S1/S0) \leq (S2/S0') \tag{4}$$

* * * * *